Aug. 18, 1970  H. J. FALBORG ETAL  3,524,297
PROCESS FOR COMPRESSING, MOULDING, AND
PACKING OF FOOD SUBSTANCES
Filed Feb. 2, 1967
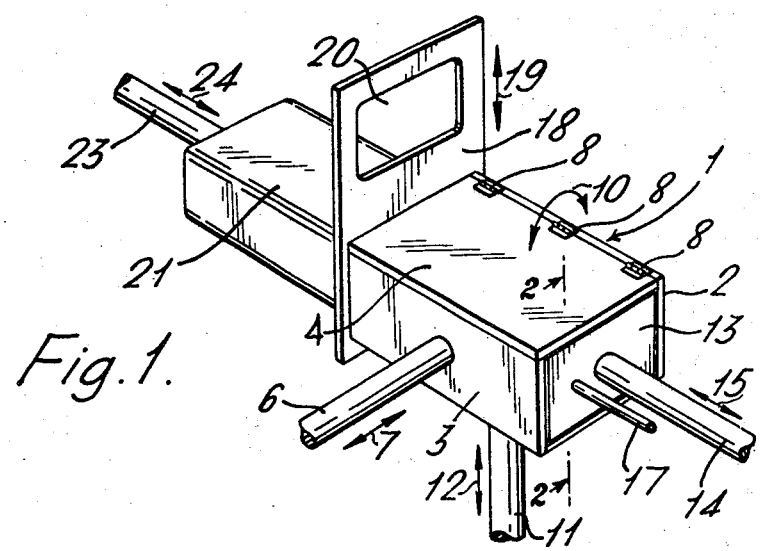
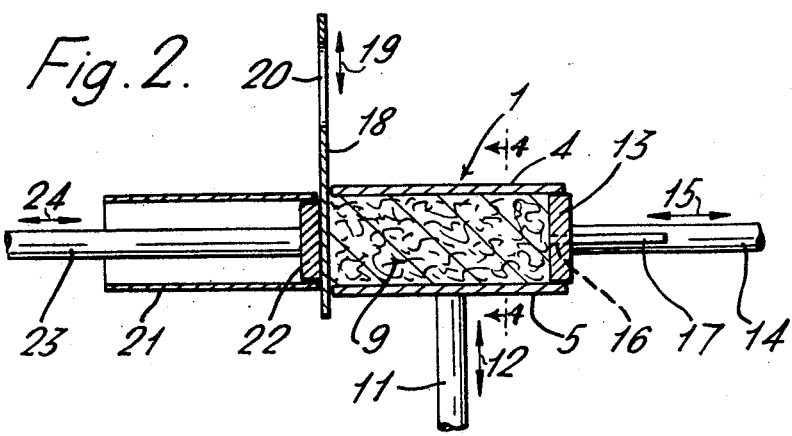
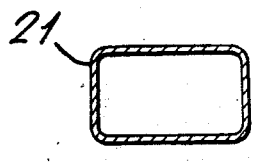
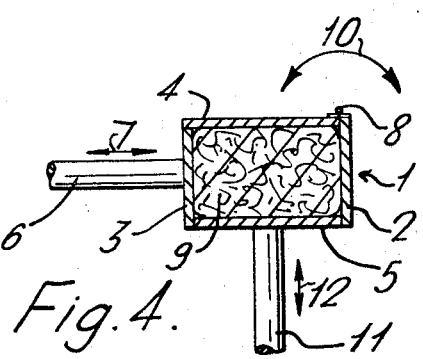
INVENTORS
HELGE JØRGEN FALBORG
FRANK PEDERSEN
BY
Edward F. Levy
ATTORNEY United States Patent Office 3,524,297
Patented Aug. 18, 1970

3,524,297
PROCESS FOR COMPRESSING, MOULDING, AND PACKING OF FOOD SUBSTANCES
Helge Jorgen Falborg, Kattedamsvej 12, Aabybro, Denmark, and Frank Pedersen, Romers Have 4, Norresundby, Denmark
Filed Feb. 2, 1967, Ser. No. 613,544
Int. Cl. B65b 1/24, 1/26, 63/02
U.S. Cl. 53—22                               1 Claim

ABSTRACT OF THE DISCLOSURE

A method and apparatus for preparing for packing, compressible meats or similar substances. The meat is placed in a compression chamber and is compressed and moulded on all sides to substantially the inner dimensions of the container in which it is to be packed, while simultaneously any air present in the chamber is removed by creation of a vacuum therein. The meat is then pushed under vacuum and in its compressed state into a filling sleeve of substantially similar dimensions around which is placed the container. The sleeve is removed and the meat is further moulded to fill the interior of the container.

---

Known types of apparatus for the purpose of packing compressed meats or similar substances in a container, are so designed that the meat (for example, ham) is squeezed tightly into a can or other container which may be lined with a bag of plastic material, before the end of the ham which is inserted into the can, has been fully compressed. Therefore, while some compression of the ham or other meat is initially accomplished, the final compression is achieved by squeezing the meat into the can and takes place against the walls of the can, which is disadvantageous since this procedure usually involves the insertion of heavy pressures on the can.

Further, when the partially compressed meat product is forced into the container, the compressed meat does not necessarily correspond precisely to the shape and size of the container and, therefore, tends to entrap air at those places where its surfaces are not flush with the can wall. Thus, the air contained in the can will form enclosed pockets and will be prevented from escaping. The trapped air will consequently find its way into the ham or other meat product and make the quality thereof inferior.

It is an object of the present invention to provide a method and an apparatus for the compression, moulding and packing of meat substances and the like, which is effective to prevent or at least minimize the penetration of air into the meat during the packing operation and to reduce the degree of force required for compressing the meat during packing, while at the same time obtaining a well-compressed product within the container which is free of air cavities.

Another object of the present invention is to provide a method and apparatus for the simple and rapid packaging of meat products and the like.

A further object of the present invention is to provide a novel method and apparatus for the packaging of meat products and other substances in which the product is provided with a uniform compressive state throughout its entire volume.

In accordance with the present invention, there is provided a method for packing compressible products in which a meat product, for example, is first compressed on all sides to approximately the size and shape of the container into which it is to be packed. While the product is still in the compressed state, it is moved into a filling sleeve which matches the internal dimensions of the container, and the filling sleeve is then inserted fully into the container. The filling sleeve is then withdrawn from the container in such a manner as to leave the compressed product within the container. Since the product has previously been compressed into substantially the size of the container, upon the final application of end pressure, it expands very slightly and fills the container uniformly without the entrapment of air pockets.

The invention also contemplates the provision of apparatus for performing the aforementioned method, the apparatus comprising a compression chamber having power driven movable walls which form an inner compression recess of rectangular cross section and having sharp corners. Means are also provided for creating a vacuum condition within the compression chamber and the sharp croners of the recess are effective to provide internal channels whereby the vacuum is applied along the entire extent of the compressed product. In addition, the walls of the compression chamber which apply end pressure upon the product are in the form of movable pistons which are also employed in moving the product under compressive force from the cmopression chamber into the filling sleeve.

Additional objects and advantages of the invention will become apparent in the course of the following specification when taken in connection with the accompanying drawings, in which:

FIG. 1 is a perspective view of the compressing and packing apparatus made in accordance wtih the invention, the apparatus being shown at the stage in which the product is being compressed within the compression chamber;

FIG. 2 is a vertical section taken along line 2—2 of FIG. 1;

FIG. 3 is a horizontal section through the interior of the filling sleeve with the counter-piston removed therefrom; and FIG. 4 is a section taken along line 4—4 of FIG. 2.

Referring in detail to the drawings, there is shown a compression chamber 1 which is formed of a fixed side wall 2, an opposed movable side wall 3, a cover 4 constituting the top wall, and a movable bottom wall 5.

The side wall 3 can be pressed and moved inwardly toward the interior of the chamber and also pulled outwardly by means of a pneumatic, hydraulic or mechanical load on a rod 6 secured to the side wall 3, as shown by the double arrow 7 in FIGS. 1 and 4. The cover 4 is mounted on hinges 8 and can be opened for the feeding of a meat substance or the like 9, for example, a ham substance, and closed again as shown by the curved double arrow 10 in FIGS. 1 and 4. The hinges 8 may be self-locking so as to maintain the cover 4 secured in its closed position against the compressive force within the chamber 1, or conventional clasp or other locking means (not shown) may be employed for holding the top wall 4 securely relative to the fixed side wall 2. The bottom wall 5 can be pressed upwardly and pulled downwardly by means of a rod 11 secured thereto, as indicated by the double arrow 12.

The chamber 1 also has a movable end wall provided by a piston 13 which is moved by means of a rod 14 secured thereto in the forward and rearward directions indicated by the double arrow 15 in FIGS. 1 and 2. The end piston 13 has a through bore 16 therein, which bore is connected with a vacuum pipe 17 connected to a vacuum source such as a suction pump or the like (not shown) for the creation of a vacuum condition within the compression chamber 1. The opposed end wall of chamber 1 is in the form of a longitudinally movable retaining plate 18 which is slidable upwardly and downwardly in the directions indicated by the double arrow 19. The plate 18 has at its upper end an aperture 20 of rectangular shape with rounded corners, the size of aperture 20 corresponding substantially to the interior dimension of the compression chamber 1 when the meat product 9 is fully compressed therein. The retaining plate 18 is slidable between two operative positions, in the first of which, as shown in the drawings, the lower solid portion of the plate 18 is in registry with the end of compression chamber 1 and covers over the same as the end wall thereof. In the second operative position, the retaining plate 18 is slid downwardly until the aperture 20 is opposite to and registers with the open end of the chamber 1.

A filling sleeve 21 is securely mounted in axial alignment with the compression chamber 1 in the position shown in the drawings, in which it is spaced from the open end of the compression chamber 1 by a distance sufficient to permit the retaining plate 18 to be slid therebetween. The filling sleeve 21, as best shown in FIG. 3, is provided with rounded corners corresponding to the internal shape of a can or similar container to be filled. This container is of conventional type and is not shown in the drawings, although it is to be understood that the filling sleeve 21 is shaped and dimensioned to fit snugly within the interior of such container.

During the compression and moulding process the retaining plate 18 is backed up and supported by a counter-piston 22 which can be moved forwardly and rearwardly by a driven rod 23 as indicated by the double arrow 24. The rod 23 normally extends through the interior of the filling sleeve 21, as shown in FIG. 2, so that the counter-piston 22 engages and holds the plate 18 immovably against the open end of compression chamber 1.

Each of the various rods 6, 11, 14 and 23 may be actuated by well-known hydraulic, pneumatic or mechanical means such as motorized gearing or selectively adjustable hydraulic or pneumatic rams. The details of such drive means are not shown herein since they are old and well-known and in themselves form no part of the present invention.

As previously indicated, in the drawing the apparatus is shown in a position corresponding to the compression of the meat product 9. For this purpose, the quantity of the meat product is so selected and the dimensions of the compression chamber walls are such that when the product is fully compressed, it will be of a size and shape to fit within and fill the interior of the filling sleeve 21. In any event, in the first step of the process, the cover 4 is opened and a suitably sized piece of ham or other compressible product is inserted into the interior of the compression chamber 1. The cover 4 is now closed and secured, and the side wall 3 is pressed in as far as possible by applying force upon the rod 6. At the same time, the bottom wall 5 is pressed upwardly through the force exerted upon the rod 11. The counter-piston 22 is maintained in supporting engagement with the rear surface of retaining plate 18, and the end piston 13 is driven inwardly until it reaches the position shown, in which the ham substance no longer yields at the given pressure applied to the rod 14. Thus, the product is simultaneously pressed from all sides, and its ends are compressed between the two pistons 13 and 22. In this fully compressed condition, the walls of the compression chamber 1 are in abutment with each other and form an air-tight compression recess containing the product 9. It will be noted in FIG. 4 that this internal recess has a rectangular cross-section with square, sharp corners.

This compressed condition is maintained for a few seconds in order to enable the pressed ham or meat substance to settle in the compression chamber during the vacuum suction which follows and which will now be described. During the compression of the meat substance 9, the corners of the meat substance have not been as well compressed as the intermediate portions of the surfaces, so that the meat does not fill out the sharp corners of the compression chamber, but rather presents rounded corners as shown in FIG. 4. The rounded corners of the meat product thus form with the square corners of the compression chamber 1 longitudinally extending channels in each corner through which vacuum may be applied by means of the vacuum pipe 17. Thus, when suction is applied through pipe 17, air is exhausted throughout the entire extent of the compressed product 9, and a uniform vacuum condition is created within the compression chamber 1.

The plate 18 is now lowered, so that the aperture 20 will be opposite to and in registry with the compression chamber 1 as well as the filling sleeve 21. Just prior to the lowering of the retaining plate 18, counter-pressure on the counter-piston 22 has been momentarily relieved in order to permit the plate 18 to slide downwardly. This pressure release is only for the fraction of a second required to move plate 18, and when the aperture 20 reaches its position of registry with the end of compression chamber 1, the compressed product 9 is forced into aperture 20 and into abutment with the counter-piston 22, which, upon the application of the counter-pressure, will now press directly against the end of the pressed product. The momentary release of pressure is so brief that the compressed substance 9 has maintained its shape unaltered when the piston 22 has come to rest against the end of the substance.

As the next step, pressure on the counter-piston 22 is decreased, whereas the pressure on the end piston 13 is correspondingly increased to such an extent that the product 9, still under pressure from all sides, is moved forwardly from the compression chamber 1 through the aperture 20 and into the filling sleeve 21. As the product moves, the comparatively sharp-edged shape thereof provided by the compression chamber 1 is moulded to provide rounded corners as it passes through aperture 20 and into filling sleeve 21.

When the compressed and moulded product 9 has moved entirely into the filling sleeve 21 throughout the entire length thereof, the forward movement is stopped, the counter-piston 22 is rapidly withdrawn to provide clearance at the free end of the sleeve 21, and a plastic bag (not shown) may be slid snugly upon the filling sleeve. Immediately thereafter, without pause, a can or similar container is pushed over the filling sleeve and the plastic bag thereon until the bottom of the can engages the free end of the compressed canned substance. Thereupon, a retaining member is immediately placed into abutment with the bottom of the can to prevent rearward movement thereof. The piston 22 may be employed as such retaining member.

The can is of such a size and is so shaped, i.e. with rounded corners, that it will fit snugly over the filling sleeve 21 and the plastic bag which may have been inserted thereon. The insertion of the can over the sleeve 21 may advantageously be accomplished by means of movement of the counter-piston 22. Such insertion will take place rapidly, even though the clearance between the can and filling sleeve is negligible, since both can and filling sleeve are accurately and correspondingly shaped.

The compressed and moulded meat product 9 is now moved out of the filling sleeve 21 but maintained within the can by the cooperative action of the pistons 13 and 22 as previously described. That is to say, counter-pressure on the piston 22 is diminished while pressure on the end piston 13 is correspondingly increased, so that the piston 13 presses the poduct 9 out from the filling sleeve 21 and the can is allowed to move slowly rearwardly as piston 22 is withdrawn, while the product 9 remains in firm engagement with the bottom wall of the can. This movement is continued until the entire compressed product is in the can and out of the sleeve, after which the counter-piston 22 is completely retracted, and the can is withdrawn, closed and transported to the cooking cabinet.

Immediately after the pressure of the pistons 13 and 22 is relieved on the compressed product, that is, just after the filling of the can, the product will expand slightly and thus it will fill out the gap left behind the product and the walls of the can when the filling sleeve was withdrawn. The filling sleeve 21 is provided within walls so that the aforementioned gap is negligible and readily filled by expansion of the product.

The apparatus described above is particularly constructed for the compression of smoked hams of the "American" type which are relatively long, for example, about 500 millimeters in length. However, it is to be understood that the method and apparatus may as readily be used for the compression of other substances of different dimensions but of similar compressible qualities insofar as the moulding is concerned. The apparatus will preferably be designed for fully automatic operation, but the controls necessary for such purpose are not shown herein since they are well known and have no bearing on the present invention.

While a preferred embodiment of the invention has been shown and described herein, it is obvious that numerous changes, omissions and additions may be made in such embodiment without departing from the spirit and scope of the invention.

What is claimed is:

1. A method of compressing, moulding and packing hams or similar compressible substances of meat-like consistency into a container, compresing the steps of
   (a) inserting said substance within a compression chamber having an inwardly-movable side wall, bottom wall and end wall, and applying compressive forces simultaneously on all sides, top, bottom and ends of said substance by the application of positive inward pressure by said walls in three mutually perpendicular directions until said substance is compressed to a size and shape substantially equal to the size and shape of the container interior, the walls of said compression chamber forming an internal recess of rectangular cross-section having squared corners, and the compressed substance forming with said walls longitudinal channels along said corners,
   (b) maintaining said compressive forces on said substance to retain said fully compressed size and shape,
   (c) evacuating air from said compression chamber to create a vacuum therein during compression of said substance, said vacuum extending through said longitudinal channels along the entire extent of said substance,
   (d) thereafter moving said substance in fully compressed state from said compression chamber to the interior of a filling sleeve having a size and shape substantially equal to the size and shape of the can interior, while maintaining compressive forces on the ends of said substance,
   (e) moving said filling sleeve and the contained compressed substance as a unit into the interior of said container while said compressive forces are still applied to the sides, top, bottom and ends thereof, and thereafter removing said filling sleeve from said container, leaving said compressed substance within the latter, and
   (f) thereafter sealing said container.

References Cited

UNITED STATES PATENTS

| | | | |
|---|---|---|---|
| 3,001,343 | 9/1961 | Gordon | 53—112 |
| 3,017,730 | 1/1962 | Rodish | 53—124 |
| 3,234,709 | 2/1966 | Hertwig | 53—22 X |
| 3,382,643 | 5/1968 | Hullhorst | 53—24 |
| 3,218,778 | 11/1965 | Moreland | 53—124 |
| 3,315,435 | 4/1967 | Gunyon | 53—24 |
| 3,381,440 | 5/1968 | Aullhorst | 53—24 |
| 3,383,825 | 5/1968 | Titchenal | 53—24 |
| 3,451,185 | 6/1969 | Tezuka | 53—22 |
| 3,451,190 | 6/1969 | Tezeuka | 53—124 |
| 3,458,966 | 8/1969 | Dunbar | 53—24 |

FOREIGN PATENTS

| | | |
|---|---|---|
| 908,447 | 4/1954 | Germany. |
| 736,356 | 6/1966 | Canada. |

WAYNE A. MORSE, Jr., Primary Examiner

U.S. Cl. X.R.

53—24, 112, 124